(No Model.)
E. WALRATH.
HARNESS.
No. 455,991. Patented July 14, 1891.
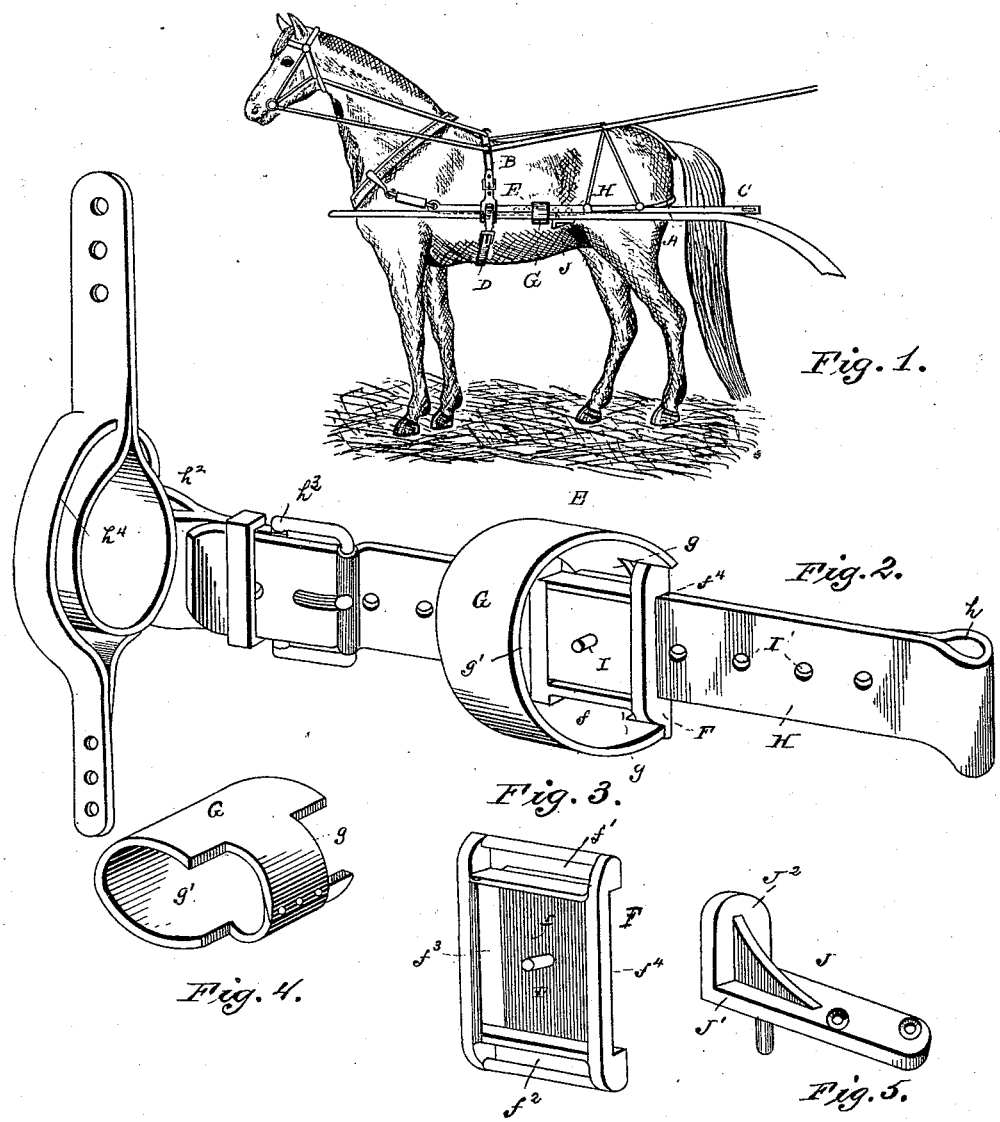
Witnesses
W. B. Harris
Saml. E. Jacobson
Edward Walrath, Inventor
By his Attorneys
Fitzgerald and Co.

UNITED STATES PATENT OFFICE.

EDWARD WALRATH, OF LAFARGEVILLE, NEW YORK.

HARNESS.

SPECIFICATION forming part of Letters Patent No. 455,991, dated July 14, 1891.

Application filed December 9, 1890. Serial No. 374,063. (No model.)

*To all whom it may concern:*

Be it known that I, EDWARD WALRATH, a citizen of the United States, residing at Lafargeville, in the county of Jefferson and State of New York, have invented certain new and useful Improvements in Holdback Attachments for Harness; and I do hereby declare the following to be a full, clear, and exact description of the invention, such as will enable others skilled in the art to which it appertains to make and use the same.

My invention relates to a holdback for harness; and it consists in the construction and novel arrangement of parts, as hereinafter more fully described, illustrated in the accompanying drawings, and pointed out in the appended claims.

The object of my invention is to provide a neat, simple, and inexpensive holdback for harness that may be readily attached to any harness; further, to do away with the necessity of securing the breeching side straps directly to the shafts of a vehicle; further, to so attach the side straps or holdback of the breeching to the harness that when the harness has been placed on the horse and it is desired to hitch him to a vehicle by simply attaching the traces to the singletree the work of hitching the horse is accomplished; further, to so construct the holdback that should the traces become detached from the singletree by accident the horse will be permitted to leave the shafts without injury to the vehicle or damage to the harness.

In the drawings, Figure 1 is a side view of a horse in harness with my improved holdback in position; Fig. 2, a detail view of the slide; Fig. 3, a detail view of the bracket; Fig. 4, a detail view of the loop. Fig. 5 is a detail view of the bracket J.

Referring to the accompanying drawings, in which like letters of reference indicate corresponding parts in all the figures, A, B, C, and D indicate the saddle, breeching-traces, and belly-band, respectively, of a harness of the usual well-known construction, and E indicates my improved holdback, which by preference is constructed as follows:

F designates a slide, the main body portion $f$ of which has formed upon it at its upper and lower edges elongated parallel slots $f'$ $f^2$, through which are passed the reduced ends $g$ of a strap G, said ends being lapped and riveted together, forming a loop $g'$, through which the shafts are adapted to be passed. At right angles to the slots $f'$ $f^2$, and between the same in the slide F, are formed vertical parallel slots $f^3$ $f^4$, for a purpose presently explained.

H designates the side strap, provided upon its rear end with a loop or buckle $h$, by means of which the breeching is attached. The opposite end of the side strap is passed through the slots $f^4$ $f^3$ and is attached to the loop $h^2$ on the end of the belly-band by means of a buckle or loop $h^3$.

Formed within the loop $h^2$ is a loop $h^4$ on the end of the side strap of the saddle A, through which passes the shaft.

For holding the slide F, as well as the loop $g'$, at a fixed point on the side strap H, I form upon the portion $f$ at its central part a pin I, which engages one of a series of eyes I', formed in the side strap H, and in order that the slide F and loop $g'$ may act as a holdback I secure by means of bolts or screws to the under side of the shaft a stop J, constructed as follows:

J' designates a plate provided with suitable bolt or screw openings, by means of which the stop is attached to the shafts, and as a further guard to prevent the stop J from becoming loose, as well as to take the strain off the screws holding the stop, I provide the plate J' with a dowel adapted to enter a suitable opening formed in the shaft. At the forward end of the plate J', and extending at right angles thereto, is a depending arm $J^2$, against which the loop $g'$ is designed to strike, and to strengthen said arm a knee-brace is formed in the junction of the arm $J^2$ and plate J'.

To hitch a horse to a vehicle with my improved holdback attached, the harness having been placed upon the horse, the shafts are passed through the loops $g'$ and $h^2$. The traces are then attached to the ends of the singletree. It will thus be seen that the hitching of a horse to a vehicle using my device only requires the fastening of the traces to the singletree.

I do not desire to confine myself to the precise construction herein shown and described, as many minor changes may be made without departing from the spirit of my invention.

Having thus described my invention, what I claim is—

1. In a holdback attachment, the combination, with the saddle and breeching of a harness, of the side strap carrying a loop encircling the shaft and attached to a slide having an upstanding pin adapted to engage one of a series of openings in the side strap, and means, substantially as shown, for limiting the movements of the loop on the shaft, substantially as described.

2. The combination, with the saddle and breeching of a harness, of the side strap secured to the breeching and belly-band carrying a loop encircling the shaft secured to an adjustable slide on the side strap adapted to abut against a stop formed on the shaft, substantially as described.

In testimony whereof I affix my signature in presence of two witnesses.

EDWARD WALRATH.

Witnesses:
HAROLD FORD,
LYMAN LADD.